United States Patent
Soejima

(10) Patent No.: US 9,003,370 B2
(45) Date of Patent: Apr. 7, 2015

(54) APPLICATION MODIFICATION PORTION SEARCHING DEVICE AND APPLICATION MODIFICATION PORTION SEARCHING METHOD

(75) Inventor: Kenji Soejima, Tokyo (JP)

(73) Assignee: NEC Corporation, Tokyo (JP)

( * ) Notice: Subject to any disclaimer, the term of this patent is extended or adjusted under 35 U.S.C. 154(b) by 124 days.

(21) Appl. No.: 13/582,701

(22) PCT Filed: Mar. 2, 2011

(86) PCT No.: PCT/JP2011/054758
§ 371 (c)(1),
(2), (4) Date: Nov. 14, 2012

(87) PCT Pub. No.: WO2011/108584
PCT Pub. Date: Sep. 9, 2011

(65) Prior Publication Data
US 2013/0055216 A1    Feb. 28, 2013

(30) Foreign Application Priority Data
Mar. 4, 2010   (JP) .................................. 2010-047845

(51) Int. Cl.
G06F 11/36          (2006.01)
(52) U.S. Cl.
CPC ................................... G06F 11/3672 (2013.01)
(58) Field of Classification Search
None
See application file for complete search history.

(56) References Cited

U.S. PATENT DOCUMENTS

| | | | |
|---|---|---|---|
| 5,860,009 A | 1/1999 | Uchihira et al. | |
| 6,182,246 B1* | 1/2001 | Gregory et al. | 714/38.14 |
| 2001/0020293 A1* | 9/2001 | Uchihira et al. | 717/4 |
| 2003/0014734 A1* | 1/2003 | Hartman et al. | 717/125 |
| 2009/0319996 A1* | 12/2009 | Shafi et al. | 717/125 |

FOREIGN PATENT DOCUMENTS

| | | |
|---|---|---|
| CN | 1123930 A | 6/1996 |
| CN | 1359492 A | 7/2002 |
| CN | 101079000 A | 11/2007 |
| JP | 2007-122670 A | 5/2007 |
| JP | 2007-213487 A | 8/2007 |

(Continued)

OTHER PUBLICATIONS

Jiro Mimura, et al., "A Framework for Adding Feedback Information Gathering Function to Software", IPSJ SIG Technical Report, Mar. 11, 2009, pp. 43-48, vol. 2009, No. 33.

(Continued)

*Primary Examiner* — Li B Zhen
*Assistant Examiner* — Joanne Macasiano
(74) *Attorney, Agent, or Firm* — Sughrue Mion, PLLC

(57) ABSTRACT

There are provided: a test executing section which generates a plurality of logs when executing a coverage test for an application based on an inputted parameter; and a result processing section which generates a point candidate report based on the plurality of logs. The plurality of logs respectively indicate a call stack of a method designating the parameter as an argument among a plurality of methods called during execution of the coverage test. The call stack indicates a location on the application, in which a call of the method is defined. The point candidate report indicates a candidate for a point in the application, for which a modification is necessary when a dispatch of process is executed based on the parameter.

7 Claims, 10 Drawing Sheets

(56) References Cited

FOREIGN PATENT DOCUMENTS

| | | |
|---|---|---|
| JP | 2007-213498 A | 8/2007 |
| JP | 2008-310679 A | 12/2008 |
| JP | 2009-116618 A | 5/2009 |
| WO | 00/43880 A1 | 7/2000 |
| WO | 2008/096632 A1 | 8/2008 |

OTHER PUBLICATIONS

International Preliminary Report on Patentability issued on Oct. 2, 2012 in PCT/JP2011/054758.
Chinese Office Action dated Dec. 2, 2014, issued in Chinese Application No. 201180012313.3.

* cited by examiner

FIG. 5

```
                    E100
                     |
┌─────────────────────────────────────────┐
│ dataSource                              │
│ setting. properties                     │
└─────────────────────────────────────────┘
                     (
                    E101
```

FIG. 6

```
@Aspect
public class SearchParameterAspect{
    @Pointcut("execution(*  *.*(..))")  ⎫
    void   pointcutExec(){}              ⎬ F100
                                         ⎭

@Before("pointcutExec()")   }F101
    public void checkParameter(JoinPoint thisJoinPoint) {
        for (int i=0;i<parameter. length;i++) {   }F102
            for (int j=0;j<thisJoinPoint. getArgs(). length;j++) {   }F103
                if(parameter[i]. equals(thisJoinPoint. getArgs()[j]){  ⎫
                    LOG. log(parameter[i], Thread. dumpStack());       ⎬F104
                }                                                       ⎭
            }
        }
    }
}
```

FIG. 8

```
{
A. two(A. java:150)
A. one(A. java:100)
Application. main(Application. java:100)
}
```
⎫ G100

```
{
A. two(A. java:150)
A. one(A. java:100)
Application. main(Application. java:100)
}
```
⎫ G101

```
{
A. three(A. java:200)
A. two(A. java:150)
A. one(A. java:100)
Application. main(Application. java:100)
}
```
⎫ G102

```
{
A. four(A. java:250)
A. one(A. java:100)
Application. main(Application. java:100)
}
```
⎫ G103

FIG. 9

```
{
A. five(A. java:150)
A. one(A. java:100)
Application. main(Application. java:100)
}
```
G104

FIG. 10

```
{
A. two(A. java:150)
A. one(A. java:100)
Application. main(Application. java:100)
}
```
G100

```
{
A. two(A. java:150)
A. one(A. java:100)
Application. main(Application. java:100)
}
```
G101

```
{
A. four(A. java:250)
A. one(A. java:100)
Application. main(Application. java:100)
}
```
G103

```
{
A. three(A. java:200)
A. two(A. java:150)
A. one(A. java:100)
Application. main(Application. java:100)
}
```
G102

FIG. 11

```
{
A. two(A. java:150)
A. one(A. java:100)
Application. main(Application. java:100)
}
```
⎫G100

```
{
A. four(A. java:250)
A. one(A. java:100)
Application. main(Application. java:100)
}
```
⎫G103

```
{
A. three(A. java:200)
A. two(A. java:150)
A. one(A. java:100)
Application. main(Application. java:100)
}
```
⎫G102

FIG. 12

```
{
A. two(A. java:150)
A. one(A. java:100)
Application. main(Application. java:100)
}
```
⎫G100

```
{
A. four(A. java:250)
A. one(A. java:100)
Application. main(Application. java:100)
}
```
⎫G103

FIG. 13

■ DISPATCH POINT CANDIDATE WITH RESPECT TO dataSource
CLASS A, METHOD two (A.java: 150th LINE) } G100
CLASS A, METHOD four (A.java: 250th LINE) } G102

■ DISPATCH POINT CANDIDATE WITH RESPECT TO setting.properties
CLASS A, METHOD five (A.java: 450th LINE) } G104

APPLICATION MODIFICATION PORTION SEARCHING DEVICE AND APPLICATION MODIFICATION PORTION SEARCHING METHOD

CROSS REFERENCE TO RELATED APPLICATIONS

This application is a National Stage of International Application No. PCT/JP2011/054758, filed on Mar. 2, 2011, which claims priority from Japanese Patent Application No. 2010-047845, filed on Mar. 4, 2010, the contents of all of which are incorporated herein by reference in their entirety.

TECHNICAL FIELD

The present invention relates to an application modification portion searching device and an application modification portion searching method, and in particular, relates to an application modification portion searching device and an application modification portion searching method which are used in customization of an application.

BACKGROUND ART

It is desired to simplify a procedure for customizing an application. Japanese patent publication (JP-P2007-122670A) discloses a form generating system which enables customization for arbitrary functions and information while significantly reducing workload of users related to form customization, and which can follow a version up.

The form generating system uses package software for form generation. The form generating system includes a retaining section, an updating section, and an outputting section. The retaining section retains customization information for an output form as difference information for package software. When the package software is modified, the updating section reflects the customization information retained in the retaining section on the modified package software. When the package software is modified, the outputting section outputs a customized form on which modification due to the customization information is reflected.

That is to say, a version up function according to Japanese patent publication (JP-P2007-122670A) performs process for applying the modification portion of the package software on the customized form, when the application is modified by version up. Additionally, customized information is saved in a customized information file. Customization difference information is saved in a customization difference information file.

Japanese patent publication (JP-P2008-310679A) discloses a dynamic design information generating apparatus which can automatically generate dynamic design information even when specification or the like is incomplete. The dynamic design information generating apparatus includes a program analyzing section, an information adding section, a program executing section, and a design information generating section. The program analyzing section analyzes structure of a program. The information adding section refers to the program analyzed by the program analyzing section and adds information for generating execution order information of the program to the program. The program executing section executes the program to which the information is added, in accordance with a predetermined execution condition. Dynamic design information is generated from the execution order information of the program obtained through the execution of the program by the program executing section.

Japanese patent publication (JP-P2007-213487A) discloses an aspect generating apparatus which can easily generate an aspect to be incorporated into an assumed location of a program as an incorporation target in an application development using aspect-oriented programming.

The aspect generating apparatus generates as an aspect, a process common to classes used in a program as a development target. The aspect generating apparatus includes a class information analyzing section, an advice analyzing section, a user interface managing section, and an aspect generating section.

The class information analyzing section reads a class file used in the program as development target from a first storage section, and analyzes structure of each class in the class file. Then, the section acquires a class name, a method name, and a signature which are used in each class and generates, based on the acquired class name, method name, and signature, candidates for class name, method name, and signature which are defined in an aspect to be generated.

The advice analyzing section reads candidates for advice given by an aspect to be cut out as common process from a second storage section, and analyzes data structure of the candidates for advice.

Based on the results of the analysis of class structure by the class information analyzing section, the user interface managing section causes a graphical user interface screen to display a class diagram showing class names, method names, and signatures for the classes used in the program as development target and the candidates for advice analyzed by the advice analyzing section.

When arbitrary icon selected by a user from the candidates of advice displayed on the graphical user interface screen is dragged to a position of arbitrary class in the class diagram, the aspect generating section displays the candidates for class name, method name, and signature which are generated by the class information analyzing section and can be selected in that class. Then, the section generate an aspect by applying data of the candidates for class name, method name, and signature, which are selected by the user, to the data structure of the candidate for advice, which is selected by the user.

Japanese patent publication (JP-P2007-213498A) discloses an aspect display system which can display process of aspect to be incorporated, on a circumference of a source code of process of a target program based on point-cut by the aspect and designation of advice, and which can easily trace an entire flow of final process of the program into which the aspect is incorporated.

The aspect display system displays an aspect to be incorporated into a computer program, in a source code of the computer program. The aspect display system includes a reading section, a code analyzing section, an aspect analyzing section, and a display controlling section.

The reading section reads a source code and a compiled executable code of a computer program, and a source code and a compiled executable code of an aspect program according to aspect-oriented programming.

The code analyzing section analyzes the compiled executable code of the computer program to acquire information for identifying a procedure definition belonging to the computer program, and a start source code line and an end source code line of the computer program which correspond to a start command and an end command of the procedure definition, and stores them in a storage section.

The aspect analyzing section analyzes the compiled executable code of the aspect program. Then, the section detects information of an incorporation target procedure based on information for identifying an incorporation portion definition belonging to the aspect program and a character string defined in the incorporation portion definition. Then, the section acquires information for identifying an incorporation procedure definition associated with the incorporation portion definition, and a start source code line and an end source code line of the aspect program which correspond to a start command and an end command of the incorporation procedure.

The display controlling section selects a source code of a computer program and searches for information of an incorporation target procedure which coincides with information for identifying a procedure definition belonging to the selected computer program. Then, the section acquires information for identifying an incorporation procedure definition associated with information for identifying an incorporation portion definition to which the coinciding incorporation target procedure belongs. Then, the section displays incorporation process between a start source code line and an end source code line of the incorporation procedure definition through insertion or replacement, on a circumference of a start source code line and an end source code line of the procedure definition belonging to the corresponding computer program.

CITATION LIST

Patent Literature

Patent literature 1: Japanese patent publication (JP-P2007-122670A)
Patent literature 2: Japanese patent publication (JP-P2008-310679A)
Patent literature 3: Japanese patent publication (JP-P2007-213487A)
Patent literature 4: Japanese patent publication (JP-P2007-213498A)

SUMMARY OF INVENTION

As for the relevant application customization, there is proposed an application of a program modification portion such as version up function which realizes customized operation by modifying a portion of a program. On the other hand, there is not proposed a support for judging which portion of a program should be modified in order to customize the program. Therefore, there is a problem that a development of a program necessary for customization is difficult.

An exemplary object of the present invention is to provide an application modification portion searching device and an application modification portion searching method that simplify a procedure for customization of existing application.

An application modification portion searching device according to the present invention includes: a test executing section which generates a plurality of logs when executing a coverage test for an application based on an inputted parameter; and a result processing section which generates a point candidate report based on the plurality of logs. The plurality of logs respectively indicate a call stack of a method designating the parameter as an argument among a plurality of methods called during execution of the coverage test. The call stack indicates a location on the application, in which a call of the method is defined. The point candidate report indicates a candidate for a point in the application, for which a modification is necessary when a dispatch of process is executed based on the parameter.

An application modification portion searching method according to the present invention includes: a step of generating a plurality of logs when executing a coverage test for an application based on an inputted parameter; a step of generating a point candidate report based on the plurality of logs; and a step of customizing the application based on the point candidate report. The plurality of logs respectively indicate a call stack of a method designating the parameter as an argument among a plurality of methods called during execution of the coverage test. The call stack indicates a location on the application, in which a call of the method is defined. The point candidate report indicates a candidate for a point in the application, for which a modification is necessary when a dispatch of process is executed based on the parameter.

According to an application modification portion searching device and an application modification portion searching method according to the present invention, a user can refer to candidates of point in an application, for which modification is necessary, and therefore can easily customize the application.

BRIEF DESCRIPTION OF DRAWINGS

The above objects, advantages, and features of the present invention will be more apparent from the description of exemplary embodiments taken in conjunction with the accompanying drawings, in which:

FIG. 5 shows an example of parameter definition;
FIG. 6 shows an example of aspect definition;
FIG. 8 shows a portion of result of process of step A300;
FIG. 9 shows another portion of the result of process of step A300;
FIG. 10 shows result of process of step A301;
FIG. 11 shows result of process of steps A302 to A305;
FIG. 12 shows result of process of steps A306 to A308;
and
FIG. 13 shows a point candidate report.

DESCRIPTION OF EMBODIMENTS

Figure 1:
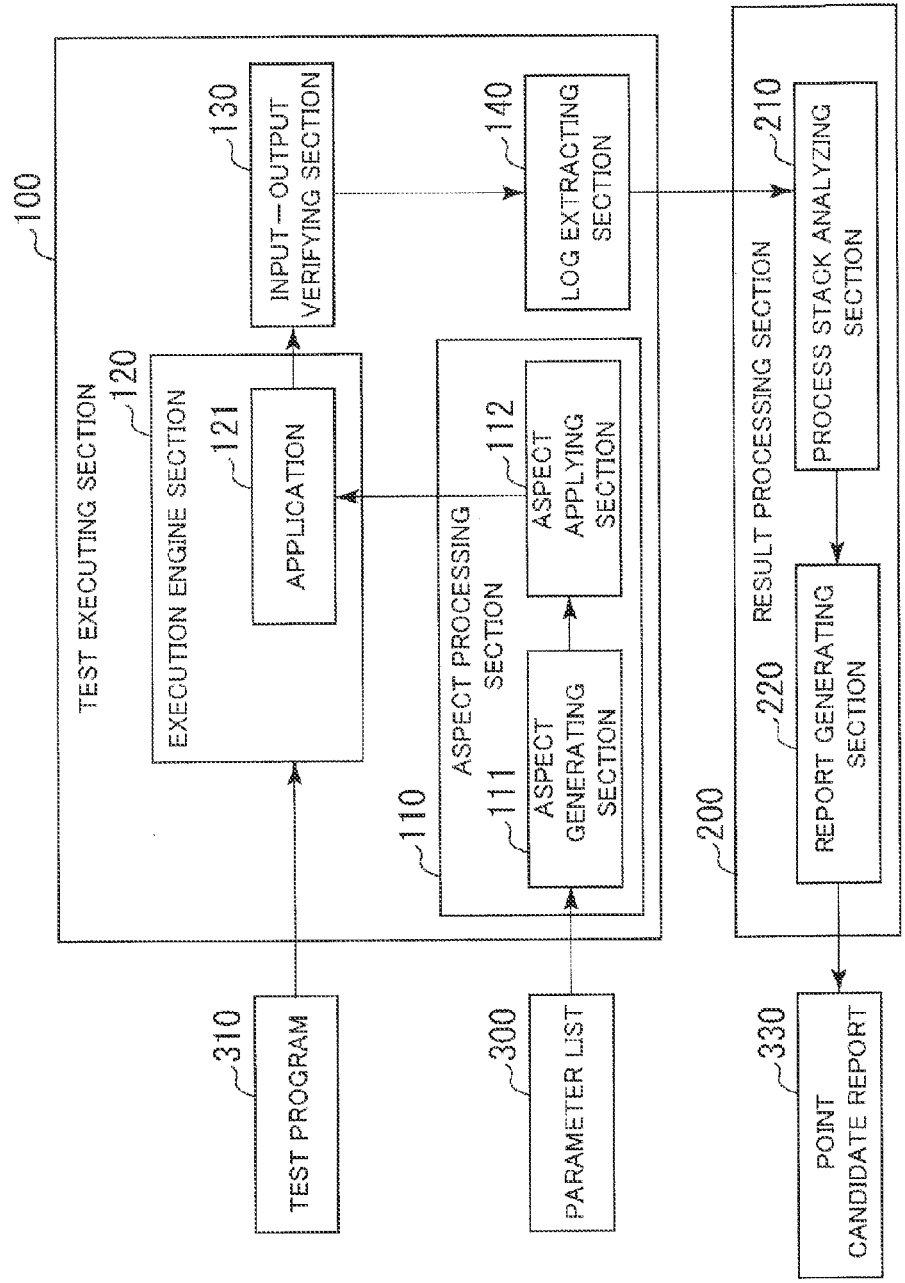
FIG. 1 is a block diagram showing an application modification portion searching device according to the present invention.

Exemplary embodiments of an application modification portion searching device according to the present invention will be described below with reference to the drawings. However, the exemplary embodiments do not limit the technical scope of the present invention. As shown in FIG. 1, the application modification portion searching device includes a test executing section 100 and a result processing section 200. The test executing section 100 is a base environment on which an application 121 operates. The result processing section 200 processes operation logs outputted from the test executing section 100, and generates a point candidate report.

The test executing section 100 includes an aspect processing section 110, an execution engine section 120, an input-output verifying section 130, and a log extracting section 140. The aspect processing section 110 has a function of inserting process for outputting an operation log into the application 121. The execution engine section 120 has a function of executing the application 121. Furthermore, the execution engine section 120 executes a coverage test of logics of the application 121 by using a test program 310. The application modification portion searching device according to the present invention includes an input device (not shown). The application modification portion searching device according to the present invention inputs the application 121 and the test program 310 through the input device. The coverage test means a test having as input, a condition in which logics implemented in the application 121 are exhaustively executed. The coverage test is prepared as a unit test in general, together with implementation of the application 121. The input-output verifying section 130 has a function of judging whether an argument of a method call occurring in the application 121 matches a parameter list 300. The log extracting section 140 has a function of outputting a method call occurring in the application 121, in the form of a call stack (call path).

The aspect processing section 110 includes an aspect generating section 111 and an aspect applying section 112. The aspect generating section 111 has a function of generating logic in the form of an aspect, which judges whether an argument of a method call occurring in the application 121 matches a parameter group defined in the parameter list 300. The application modification portion searching device according to the present invention inputs the parameter list 300 through the input device. The aspect applying section 112 has a function of applying the aspect generated by the aspect generating section 111 to the application 121.

The result processing section 200 includes a process stack analyzing section 210 and a report generating section 220. The process stack analyzing section 210 has a function of analyzing a plurality of call stacks outputted by the log extracting section 140 and merging the plurality of call stacks. The report generating section 220 has a function of generating a modification point candidate report 330 based on the merged plurality of call stacks. The modification point candidate report 330 indicates the process call stacks merged by the process stack analyzing section 210, as candidates for modification portion. The result processing section 200 further includes an output device (not shown). The output device displays the modification point candidate report 330.

Figure 2:
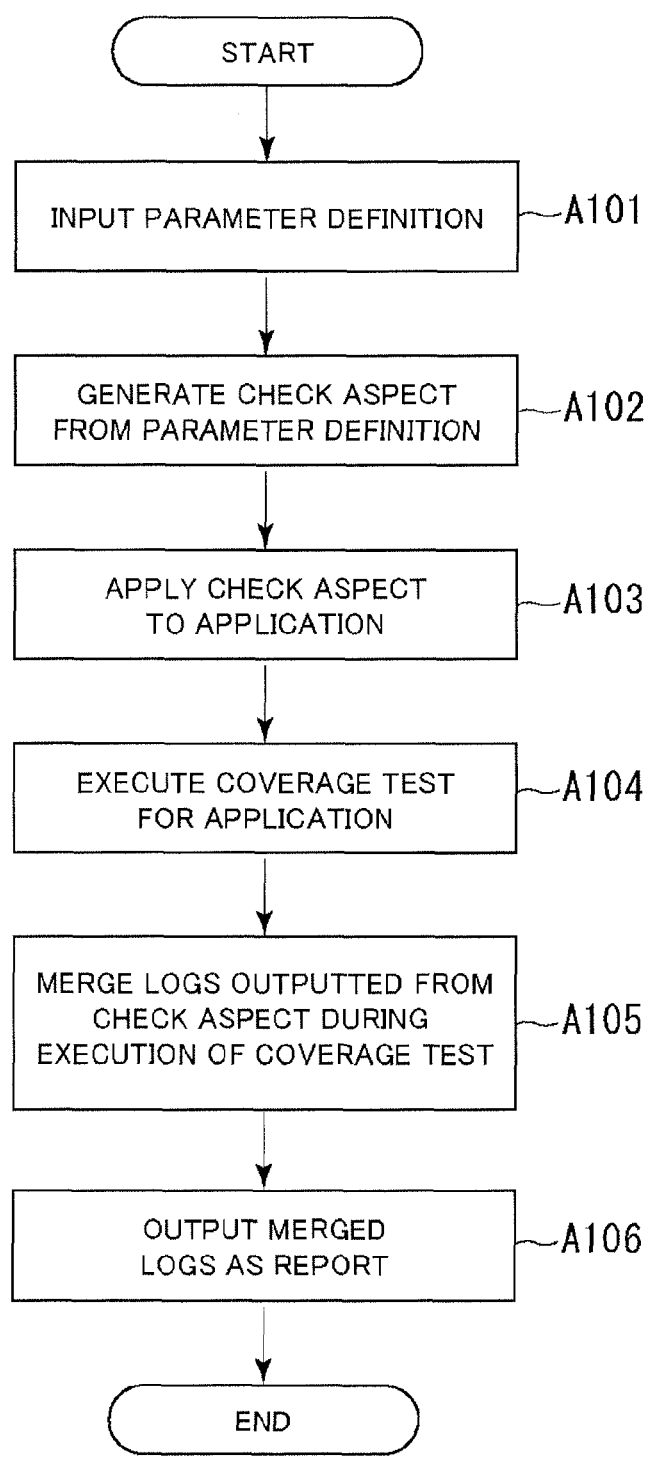
FIG. 2 is a flow chart showing an application modification portion searching method according to the present invention.

FIG. 2 illustrates an application modification portion searching method according to the present invention. First, a user generates a parameter definition and generates the parameter list 300 based on the parameter definition. The user causes the aspect processing section 110 to input the parameter list 300 through the input device (step A101). Parameters described in the parameter list 300 are IDs for identifying customization targets, which are exemplified by file names, URLs, and database names.

The aspect generating section 111 generates an aspect definition from the inputted parameter list 300 (step A102). Here, the generated aspect definition is for checking whether a parameter appears as an argument of each method call in the application. The aspect definition is implemented with process to compare a parameter group defined in the parameter list 300 and an argument of method with respect to every method call.

The aspect applying section 112 applies the aspect definition generated by the aspect generating section 111 to the application 121 (step A103). Due to the application procedure, a check of a parameter defined in the aspect definition and an argument of a method is carried out at the timing of every method call in the application 121.

The execution engine section 120 executes a coverage test of logics of the application 121 by using the test program 310 (step A104). The coverage test means a test having as input, a condition in which logics implemented in the application 121 are exhaustively executed. It is prepared as a unit test in general, together with implementation of the application 121.

The test executing section 100 further executes processes defined in the aspect definition generated by the aspect generating section 111 at the time of execution of the step A104. As a result of the execution of the processes defined in the aspect definition, operation logs are generated.

The result processing section 200 merges the operation logs generated in the step A104 (step A105). The result processing section 200 outputs the merged operation logs as the modification point candidate report 330 (step A106). The modification point candidate report 330 indicates locations of portions in which methods calling specific input parameters are defined, on application source code. That is to say, information included in the modification point candidate report 330 is parameter identifiers, method names, and line numbers on application source code defining the corresponding methods.

Figure 3:
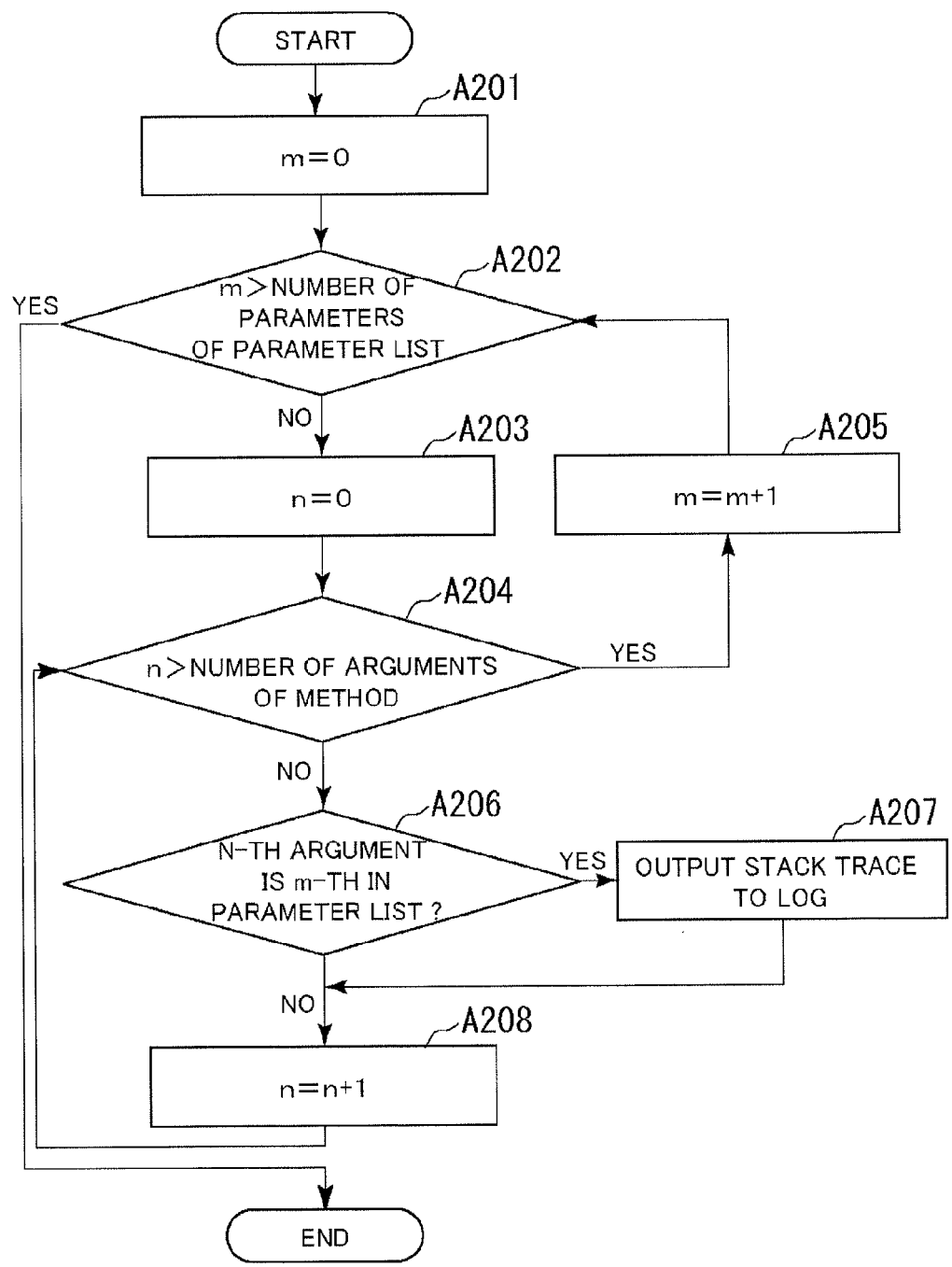
FIG. 3 is a flow chart showing operation of an input-output verifying section.

FIG. 3 shows the process defined in the aspect definition generated by the aspect generating section 111. The process is executed every time when a method of the application 121 is called during the execution of the step A104. The input-output verifying section 130 first resets m which indicates an index of a parameter in the parameter list 300 under processing, to 0 when a method of the application 121 is called (step A201). Next, the input-output verifying section 130 evaluates whether m is greater than the number of parameters defined in the parameter list 300 (step A202). When the evaluation of the step A202 is true, i.e. when m is greater than the number of parameters (YES at the step A202), the input-output verifying section 130 ends the process.

When the evaluation of the step A202 is false, i.e. when m is not greater than the number of parameters (NO at the step A202), the input-output verifying section 130 resets n which indicates an index (order) of an argument of a method under processing, to 0 (step A203). Next, the input-output verifying section 130 evaluates whether n is greater than the number of arguments defined in the method under processing (step A204). When the evaluation of the step A204 is true, i.e. when n is greater than the number of the arguments (YES at the step A204), the input-output verifying section 130 adds 1 to m (step A205) and returns to the process of the step A202.

When the evaluation of the step A204 is false, i.e. when n is not greater than the number of arguments (NO at the step A204), the input-output verifying section 130 evaluates whether the argument of the n-th method is the same as the m-th value in the parameter list 300 (step A206). When the evaluation of the step A206 is true, i.e. when the argument of the n-th method is the same as the m-th value (YES at the step A206), the input-output verifying section 130 outputs a call stack to the operation log at the time when the corresponding method is called (step A207). The matched parameter in the parameter definition, call stack information indicating the call order of the matched method, and the location (line number) of the matched method on source code are recorded in the operation log to be outputted.

When the evaluation of the step A206 is false, i.e. when the argument of the n-th method is not the same as the m-th value (NO at the step A206) or after the step A207, the input-output verifying section 130 adds 1 to n (step A208) and returns to the process of the step A204.

Figure 4:
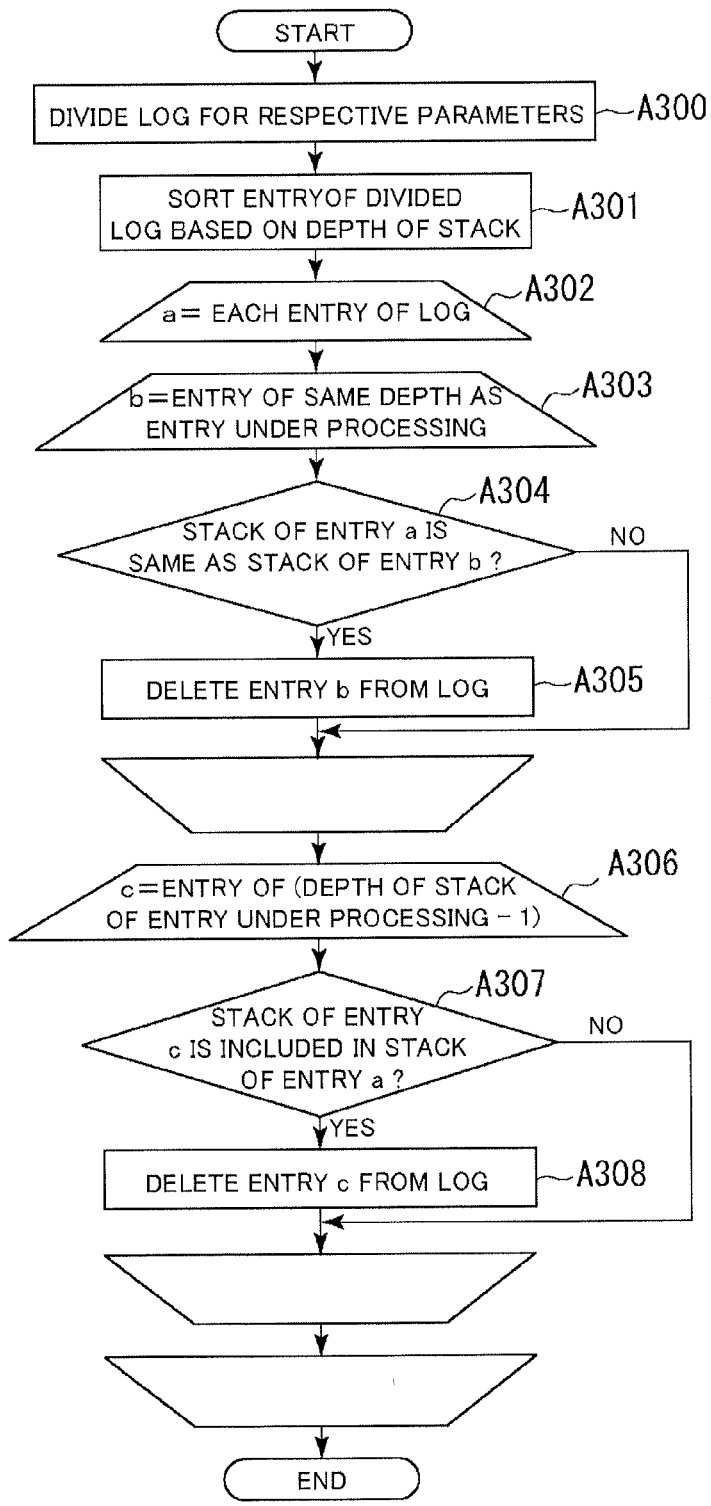
FIG. 4 is a flow chart showing operation of a result processing section.

FIG. 4 shows operation of the step A105. First, the process stack analyzing section 210 divides the operation log outputted in the step A207 for every parameter as the comparison target (step A300). Next, the process stack analyzing section 210 sorts a set of the operation logs for each parameter in ascending order of depth of call stack (step A301). For example, when there are call stack D100 (Method A→Method B→Method C→Method D) and call stack D101

(Method A→Method B→Method C), the process stack analyzing section 210 sorts the call stacks D100 and D101 in the order (call stack D101→call stack D100) since the depth of call stack D101 is shallower.

Next, the process stack analyzing section 210 repeats a predetermined process the same number of times as the number of entries of the list sorted in the step A301 (step A302).

Next, the process stack analyzing section 210 repeats a predetermined process the same number of times as the number of entries (b) having a call stack of the same depth as a call stack of an entry (a) under processing (step A303).

Next, the process stack analyzing section 210 evaluates whether the call stack of the entry (a) is the same as the call stack of the entry (b) (step A304). When the evaluation of the step A304 is true, i.e. when the call stack of the entry (a) is the same as the call stack of the entry (b) (YES at the step A304), the process stack analyzing section 210 deletes the entry (b) from the operation log (step A305).

When the evaluation of the step A304 is false, i.e. when the call stack of the entry (a) is not the same as the call stack of the entry (b) (NO at the step A304), or after the process of the step A305 ends, the process stack analyzing section 210 continues a loop of the step A303. That is to say, the process stack analyzing section 210 executes the processes of the steps A304 and the step A305 for every entry (b) which has a call stack of the same depth as the depth of the call stack of the entry (a) under processing.

Next, the process stack analyzing section 210 repeats a predetermined process the same number of times as the number of entries (c) having a call stack of which depth is (the depth of call stack of the entry (a) under processing−1) (step A303).

The process stack analyzing section 210 evaluates whether the call stack of the entry (c) is included in the call stack of the entry (a) (step A307). When the evaluation of the step A307 is true, i.e. when the call stack of the entry (c) is included in the call stack of the entry (a) (YES at the step A307), the process stack analyzing section 210 deletes the entry (c) from the operation log (step A308).

When the evaluation of the step A307 is false, i.e. when the call stack of the entry (c) is not included in the call stack of the entry (a) (NO at the step A307), or after the process of the step A308 ends, the process stack analyzing section 210 continues a loop of the step A306. That is to say, the process stack analyzing section 210 executes the processes of the step A307 and the step A308 for every entry (c) which has a call stack of the same depth as the depth (=depth of the call stack of the entry (a) under processing−1).

After the loop of the step A306 ends, the process stack analyzing section 210 continues a loop of the step A302. That is to say, the process stack analyzing section 210 executes the processes of the steps A303 to A308 for every entry of the list sorted in the step A301.

By executing the above operation, the application modification portion searching device according to the present invention can automatically find modification candidate portions of the process necessary for customizing the application. In addition, an application developer do not need to understand the entire application source code, and can know portions on source code for which modification is necessary in customizing the application 121 by referring to the point candidate report 330, thereby can customize the application 121 easily.

The application modification portion searching device according to the present invention generates the log for finding modification candidate portions of process necessary for customizing the application 121 by embedding comparative logic of the argument of the method and the parameter with the use of an aspect technology. Therefore, the application modification portion searching device according to the present invention can achieve comprehensive search as described above without additionally implementing special logic in the application 121, and can prevent source code contamination of the application 121.

When modification candidate portions includes the same call stack, the application modification portion searching device according to the present invention adopts a modification candidate portion with the shallowest process call stack and excludes information of the overlapped modification candidate portion. Therefore, information of the redundant modification candidate portion is not included in the obtained report of modification candidate portions, and problems are prevented that a customization process is doubly incorporated and the like.

In addition, the application modification portion searching device according to the present invention can find portions on source code, for which modification is necessary, during unit test and integration test which are ordinarily executed for an application. As a result, the application modification portion searching device according to the present invention can customize an application at low cost since a development process does not need to be changed nor extended.

EXAMPLES

The present example shows operation in case that a predetermined parameter list is gene rated by an application developer and a predetermined operation log is outputted by the test executing section 100.

FIG. 5 shows the parameter list. The parameter list shows a parameter E100 and a parameter E101. The parameter E100 indicates as a connection destination of a database, that "dataSource" is to be modified in customization. The parameter E101 indicates as a path of a setting file, that "setting.properties" is to be modified in customization. The aspect generating section 111 generates an aspect definition based on the parameter definition.

FIG. 6 shows the aspect definition. The aspect definition uses AspectJ as aspect implementation. The aspect definition realizes the flow chart in FIG. 3. The aspect definition is formed of a plurality of lines including lines F100 to F104. The line F100 indicates a definition indicating interruption to every method call. The line F101 defines that the process defined by "checkParameter" is executed at the timing defined by the line F100. The line F102 represents that processes of the line F103 and lines thereafter are repeated the same number of times as the number of parameters defined in FIG. 5. The line F103 represents that processes of the line F104 and lines thereafter are repeated the same number of times as the number of arguments of method as check target. The line F104 represents that it is checked whether a parameter as check target and an argument of the method as check target are the same value and that a process call stack is outputted to an operation log in case of the same value.

Next, the aspect generating section 111 outputs the aspect definition in FIG. 6 generated in the above way to the aspect applying section 112. Next, the aspect applying section 112 applies the aspect definition in FIG. 6 to the execution engine section 120, and to the application 121. The applying method depends on execution engines, and is not defined in the present invention. For example, when Java and AspectJ are used as execution engines, a tool of AspectJ, which is named Load Time Weaver, is attached by using an agent function of Java so as to apply the aspect.

Next, the execution engine section 120 executes the test program 310 to execute a coverage test for the application 121. The test program 310 uses parameters defined in the parameter list in FIG. 5. That is to say, it is connected as database to a connection destination "dataSource" and "setting.properties" is used as a setting file. During the coverage test, every time when a method call occurs which is included in the application 121, a checking process defined in the aspect definition of FIG. 6 operates. That is to say, the input-output verifying section 130 detects a method call. The log extracting section 140 generates an operation log based on the method call detected by the input-output verifying section 130.

Figure 7:
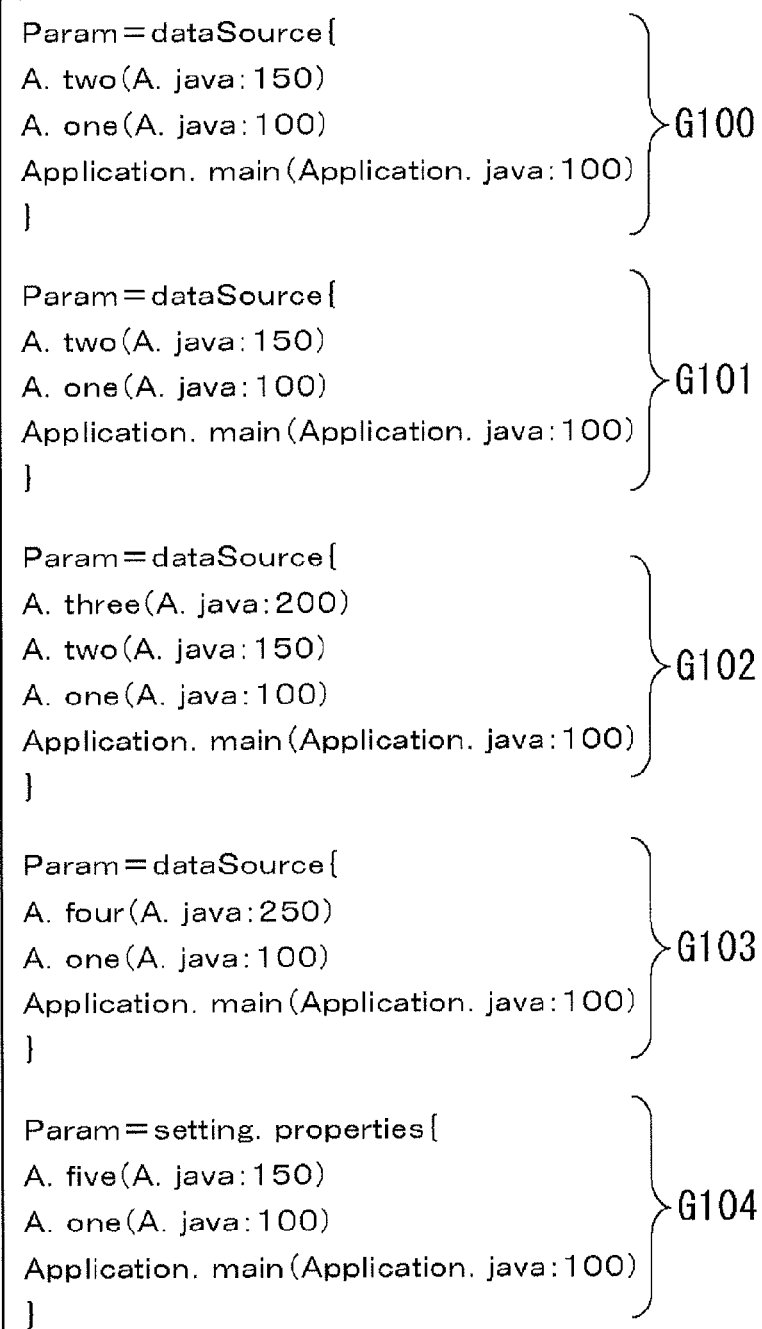
FIG. 7 shows an example of operation log.

FIG. 7 shows an example of the operation log outputted from the log extracting section 140. The operation log is formed of a plurality of entries G100 to G104. The entry G100 indicates that a parameter value "dataSource" of the parameter E100 of the parameter definition of FIG. 5 appears as an argument of a method "two" of a class "A". The entry G100 also indicates that a "main" method of a class "Application", "one" method of the class "A", and "two" method of the class "A" are called in this order as a call stack leading to the method "two" of the class "A". Parentheses on the right of each entry show a location on a source code in which the corresponding method is defined, i.e. a file and a line number of the source code. That is to say, the entry G100 indicates that the method "two" of the class "A" is defined in the 150th line of a source code "A.java".

The entry G101 indicates that a parameter value "dataSource" of the parameter E100 of the parameter definition of FIG. 5 appears as an argument of a method "two" of the class "A". The entry G102 indicates that the parameter value "dataSource" of the parameter E100 of the parameter definition of FIG. 5 appears as an argument of a method "three" of the class "A". The entry G103 indicates that the parameter value "dataSource" of the parameter E100 of the parameter definition of FIG. 5 appears as an argument of a method "four" of the class "A". The entry G104 indicates that the parameter value "setting.properties" of the parameter E100 of the parameter definition of FIG. 5 appears as an argument of a method "five" of the class "A".

The process stack analyzing section 210 divides the operation log in FIG. 7 into the same number of pieces of data as the number of parameters defined by the parameter definition, in the process of the step A300 in FIG. 4.

FIG. 8 shows data corresponding to the parameter E100 among the divided plurality pieces of data. The data is formed of an entry G100, an entry G101, an entry G102, and an entry G103. The entries G100 to G103 respectively indicates entries indicating that a parameter value of the parameter E100 appears, among the plurality of entries shown in FIG. 7. That is to say, the entry G100 corresponds to the entry G100 shown in FIG. 7. The entry G101 corresponds to the entry G101 shown in FIG. 7. The entry G102 corresponds to the entry G102 shown in FIG. 7. The entry G103 corresponds to the entry G103 shown in FIG. 7.

FIG. 9 shows data corresponding to the parameter E101 among the divided plurality pieces of data. The data is formed of an entry G104. The entry G104 indicates an entry indicating that a parameter value of the parameter E101 appears, among the plurality of entries shown in FIG. 7. That is to say, the entry G104 corresponds to the entry G104 shown in FIG. 7.

The process stack analyzing section 210 sorts the entries of the data in FIG. 8 and sorts the entries of the data in FIG. 9 in the process of the step S301 of FIG. 4.

FIG. 10 shows data generated by sorting the entries G100 to G103 of the data in FIG. 8. The data is formed of the entry G100, the entry G101, the entry G103, and the entry G102. The data shows that: the next of the entry G100 is the entry G101; the next of the entry G101 is the entry G103; and the next of the entry 103 is the entry G102. Since a depth of call stack of the entry G100 is three, a depth of call stack of the entry G101 is three, a depth of call stack of the entry G102 is four, and a depth of calls stack of the entry G103 is three, the data shows that the entry G100, the entry G101, the entry G103, and the entry G102 are sorted in ascending order of the depths. That is to say, the data shows that the orders of the entry G102 and the entry G103 of the data in FIG. 8 are exchanged.

The data of FIG. 9 is formed of the single entry G104, and therefore is not changed in the process of the step A301 of FIG. 4 to remain the data as shown in FIG. 9.

The process stack analyzing section 210 deletes a predetermined entry from the entries of the data in FIG. 10 and deletes a predetermined entry from the entries of the data in FIG. 9 in the processes of the steps A303 to A305 of FIG. 4.

FIG. 11 shows data generated by deleting the predetermined entry from the data in FIG. 10. The data is formed of the entry G100, the entry G103, and the entry G102. Since the call stacks of the entries G100 and G101 of the data of FIG. 10 are the same, the data shows the data generated by deleting the entry G101 from the data of FIG. 10.

The data of FIG. 9 is formed of the single entry G104, and therefore no entry is deleted in the processes of the steps A303 to A305 of FIG. 4 so that the data remains as shown in FIG. 9.

The process stack analyzing section 210 deletes a predetermined entry from the entries of the data in FIG. 11 and deletes a predetermined entry from the entries of the data in FIG. 9 in the processes of the steps A306 to A308 of FIG. 4.

FIG. 12 shows data generated by deleting the predetermined entry from the entries of the data of FIG. 11. The data is formed of the entry G100 and the entry G103. Since the call stack of the entry G103 of the data of FIG. 11 is included in the call stack of the entry G102, the data shows data generated by deleting the entry G102 from the data of FIG. 11.

The data of FIG. 9 is formed of the single entry G104, and therefore no entry is deleted in the processes of the steps A306 to A308 of FIG. 4 so that the data remains as shown in FIG. 9.

The report generating section 220 generates a point candidate report based on the data of FIG. 12 and the data of FIG. 9, in the process of the step A106 of FIG. 2.

FIG. 13 shows the point candidate report generated based on the data of FIG. 12 and the data of FIG. 9. The point candidate report is formed of the entry G100, the entry G02, and the entry G104.

By referring to such point candidate report, an application developer does not need to understand the entire application source code, can know portions on source code for which modification is necessary in customization of the application 121, and thereby can customize the application 121 easily.

In the example, the number of the plurality of entries shown in FIG. 11 is smaller compared with the number of the plurality of entries shown in FIG. 7. That is to say, the example further indicates that the execution of the application modification portion searching method according to the present invention by the application modification portion searching device according to the present invention can prevent problems that customization process is doubly incorporated in a case the modification candidate portions include the same call stack, or the like.

Note that the application modification portion searching device according to the present invention may be implemented by a computer. The computer includes a removable memory drive or a communication device. The removable memory drive is used to read data recorded in a recording medium when the recording medium is inserted. The removable memory drive is further used to install a computer program recorded in a recording medium on the computer when the recording medium is inserted. The recording medium is exemplified by a flash memory, a magnetic disk (a flexible disk, a hard disk), a magnetic tape (a video tape), an optical disk (a CD, a DVD), and a magneto-optical disk. The communication device is used to read information recorded in other computers through a communication network. The communication device is further used to install a computer program disclosed to the communication network, on the computer. The communication network is exemplified by a LAN, the Internet, and a dedicated line. In this case, by installing a plurality of computer programs for realizing the functions on the computer, the computer executes the application modification portion searching method according to the present invention.

With regard to the correspondence between the present description and the drawings, the reference numeral 100 indicates the test executing section. The reference numeral 200 indicates the result processing section. The reference numeral 300 indicates the parameter list. The reference numeral 110 indicates the aspect processing section. The reference numeral 111 indicates the aspect generating section. The reference numeral 112 indicates the aspect applying section. The reference numeral 120 indicates the execution engine section. The reference numeral 121 indicates the application. The reference numeral 130 indicates the input-output verifying section. The reference numeral 140 indicates the log extracting section. The reference numeral 210 indicates the process stack analyzing section. The reference numeral 220 indicates the report generating section. The reference numeral 310 indicates the test program. The reference numeral 330 indicates the point candidate report.

While the invention has been particularly shown and described with reference to exemplary embodiments (which include examples) thereof, the invention is not limited to above embodiments and examples. Various changes in form and details of the invention, which can be understood by those of ordinary skill in the art, may be made without departing from the spirit and scope of the invention.

The invention has been described above together with exemplary embodiments (which includes examples), however, it is obvious to those of ordinary skill in the art that the exemplary embodiments (which includes examples) are just provided to explain the invention; the exemplary embodiments (which includes examples) must not be depended on for the purpose of interpreting the attached claims to limit meanings.

This application is based upon and claims the benefit of priority from Japanese patent application No. 2010-047845, filed on Mar. 4, 2010, the disclosure of which is incorporated herein in its entirety by reference.

A part of or all the above embodiments can be described as the following supplementary notes but is not limited to the following.

(Supplementary Note 1)

An application modification portion searching device including:

a test executing section which generates a plurality of logs when executing a coverage test for an application based on an inputted parameter; and a result processing section which generates a point candidate report based on the plurality of logs, wherein the plurality of logs respectively indicate a call stack of a method designating the parameter as an argument among a plurality of methods called during execution of the coverage test, the call stack indicates a location on the application, in which a call of the method is defined, and the point candidate report indicates a candidate for a point in the application, for which a modification is necessary when a dispatch of process is executed based on the parameter.

(Supplementary Note 2)

The application modification portion searching device according to the supplementary note 1, wherein the test executing section includes:

an aspect processing section which generates a program logic based on the parameter;

an execution engine section which applies the program logic to the application;

an input-output verifying section which evaluate based on the program logic whether the parameter appears as an argument of each method of the application when each method is called; and a log extracting section which generates the log based on a call stack of each method when the parameter appears as an argument of each method.

(Supplementary Note 3)

The application modification portion searching device according to the supplementary note 2, wherein the result processing section includes:

a process stack analyzing section which extracts a plurality of extraction logs from the plurality of logs; and a report generating section which generates the point candidate report based on the plurality of extraction logs, a plurality of candidates indicated by the point candidate report correspond to the plurality of extraction logs; and a candidate corresponding to a single log among the plurality of candidates indicates the deepest call among call stacks indicated by the single log.

(Supplementary Note 4)

The application modification portion searching device according to the supplementary note 3, wherein when a first log of the plurality of logs includes a second log of the plurality of logs, the process stack analyzing section generates the plurality of extraction logs by deleting the first log from the plurality of logs.

(Supplementary Note 5)

The application modification portion searching device according to the supplementary note 3 or the supplementary note 4, wherein the test executing section generates a plurality of entire logs when another parameter different from the parameter is further inputted, the process stack analyzing section further divides the plurality of entire logs into the plurality of logs and a plurality of other logs indicating a call stack of another method designating the other parameter as an argument among the plurality of methods, and extracts a plurality of other extraction logs form the plurality of other logs, and the report generating section generates the point candidate report further based on the plurality of other extraction logs.

(Supplementary Note 6)

An application modification portion searching method including:

a step of generating a plurality of logs when executing a coverage test for an application based on an inputted parameter;

a step of generating a point candidate report based on the plurality of logs; and a step of customizing the application based on the point candidate report, wherein the plurality of logs respectively indicate a call stack of a method designating the parameter as an argument among a plurality of methods called during execution of the coverage test, the call stack indicates a location on the application, in which a call of the method is defined, and the point candidate report indicates a candidate for a point in the application, for which a modification is necessary when a dispatch of process is executed based on the parameter.

(Supplementary Note 7)

The application modification portion searching method according to the supplementary note 6, further including:

a step of generating a program logic based on the parameter;

a step of applying the program logic to the application;

a step of evaluating based on the program logic whether the parameter appears as an argument of each method of the application when each method is called; and a step of generating the log based on a call stack of each method when the parameter appears as an argument of each method.

(Supplementary Note 8)

The application modification portion searching method according to the supplementary note 7, further including:

a step of extracting a plurality of extraction logs from the plurality of logs; and a step of generating the point candidate report based on the plurality of extraction logs, wherein a plurality of candidates indicated by the point candidate report correspond to the plurality of extraction logs; and a candidate corresponding to a single log among the plurality of candidates indicates the deepest call among call stacks indicated by the single log.

(Supplementary Note 9)

The application modification portion searching method according to the supplementary note 8, wherein when a first log of the plurality of logs includes a second log of the plurality of logs, the plurality of extraction logs are generated by deleting the first log from the plurality of logs.

(Supplementary Note 10)

The application modification portion searching method according to the supplementary note 8 or the supplementary note 9, further including:

a step of dividing a plurality of entire logs generated when another parameter different from the parameter is further inputted, into the plurality of logs and a plurality of other logs indicating a call stack of another method designating the other parameter as an argument among the plurality of methods; and a step of extracting a plurality of other extraction logs from the plurality of other logs, wherein the point candidate report is generated further based on the plurality of other extraction logs.

(Supplementary Note 11)

A computer program causes a computer executing the application modification portion searching method according to any of the supplementary notes 6 to 10.

(Supplementary Note 12)

A computer-readable recording medium records the application modification portion searching method according to the supplementary note 11.

The invention claimed is:

1. An application modification portion searching device comprising:

a test executing section which generates a plurality of logs when executing a coverage test for an application based on an inputted parameter; and a result processing section which is executed by a processor and which generates a point candidate report based on said plurality of logs, wherein said plurality of logs respectively indicate a call stack of a method designating said parameter as an argument among a plurality of methods called during execution of said coverage test, said call stack indicates a location in said application, at which a call of said method is located, and said point candidate report indicates a candidate for a point in said application, for which a modification is necessary when a dispatch of process is executed based on said parameter, wherein said test executing section includes:

an aspect processing section which generates a program logic based on said parameter; an execution engine section which applies said program logic to said application; an input-output verifying section which evaluate based on said program logic whether said parameter appears as an argument of each method of said application when said each method is called; and a log extracting section which generates said log based on a call stack of said each method when said parameter appears as an argument of said each method, and wherein said result processing section includes:

a process stack analyzing section which extracts a plurality of extraction logs from said plurality of logs; and a report generating section which generates said point candidate report based on said plurality of extraction logs, wherein a plurality of candidates indicated by said point candidate report correspond to said plurality of extraction logs; and a candidate corresponding to a single log among said plurality of candidates indicates a deepest call among call stacks indicated by said single log.

2. The application modification portion searching device according to claim 1, wherein when a first log of said plurality of logs includes a second log of said plurality of logs, said process stack analyzing section generates said plurality of extraction logs by deleting said second log from said plurality of logs.

3. The application modification portion searching device according to claim 1, wherein said test executing section generates a plurality of entire logs when another parameter different from said parameter is further inputted, said process stack analyzing section further divides said plurality of entire logs into said plurality of logs and a plurality of other logs indicating a call stack of another method designating said another parameter as an argument among said plurality of methods, and extracts a plurality of other extraction logs form said plurality of other logs, and said report generating section generates said point candidate report further based on said plurality of other extraction logs.

4. An application modification portion searching method comprising:

generating a plurality of logs when executing a coverage test for an application based on an inputted parameter;

generating a point candidate report based on said plurality of logs; and customizing said application based on said point candidate report,
wherein said plurality of logs respectively indicate a call stack of a method designating said parameter as an argument among a plurality of methods called during execution of said coverage test,
said call stack indicates a location in said application, at which a call of said method is located,
said point candidate report indicates a candidate for a point in said application, for which a modification is necessary when a dispatch of process is executed based on said parameter,
generating a program logic based on said parameter;
applying said program logic to said application;
evaluating based on said program logic whether said parameter appears as an argument of each method of said application when said each method is called;
generating said log based on a call stack of said each method when said parameter appears as an argument of said each method,
extracting a plurality of extraction logs from said plurality of logs; and
generating said point candidate report based on said plurality of extraction logs, wherein a plurality of candidates indicated by said point candidate report correspond to said plurality of extraction logs; and
a candidate corresponding to a single log among said plurality of candidates indicates a deepest call among call stacks indicated by said single log.

5. The application modification portion searching method according to claim 4, wherein when a first log of said plurality of logs includes a second log of said plurality of logs, said plurality of extraction logs are generated by deleting said second log from said plurality of logs.

6. The application modification portion searching method according to claim 4, further comprising:
dividing a plurality of entire logs generated when another parameter different from said parameter is further inputted, into said plurality of logs and a plurality of other logs indicating a call stack of another method designating said another parameter as an argument among said plurality of methods; and
extracting a plurality of other extraction logs from said plurality of other logs,
wherein said point candidate report is generated further based on said plurality of other extraction logs.

7. A computer-readable non-transitory recording medium in which a computer-executable program code is recorded for realizing an application modification portion searching method, the method comprising:
generating a plurality of logs when executing a coverage test for an application based on an inputted parameter;
generating a point candidate report based on said plurality of logs; and
customizing said application based on said point candidate report,
wherein said plurality of logs respectively indicate a call stack of a method designating said parameter as an argument among a plurality of methods called during execution of said coverage test,
said call stack indicates a location in said application, at which a call of said method is located,
said point candidate report indicates a candidate for a point in said application, for which a modification is necessary when a dispatch of process is executed based on said parameter,
generating a program logic based on said parameter;
applying said program logic to said application;
evaluating based on said program logic whether said parameter appears as an argument of each method of said application when said each method is called;
generating said log based on a call stack of said each method when said parameter appears as an argument of said each method,
extracting a plurality of extraction logs from said plurality of logs; and
generating said point candidate report based on said plurality of extraction logs, wherein a plurality of candidates indicated by said point candidate report correspond to said plurality of extraction logs; and
a candidate corresponding to a single log among said plurality of candidates indicates a deepest call among call stacks indicated by said single log.

* * * * *